(12) United States Patent
Kwon et al.

(10) Patent No.: US 11,791,921 B2
(45) Date of Patent: Oct. 17, 2023

(54) NETWORK MANAGEMENT SYSTEM AND METHOD FOR SYNCHRONIZATION OF COMMUNICATION NETWORK

(71) Applicant: SOLiD, INC., Seongnam-si (KR)

(72) Inventors: Donghee Kwon, Seongnam-si (KR); Hoopyo Hong, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 48 days.

(21) Appl. No.: 17/120,843

(22) Filed: Dec. 14, 2020

(65) Prior Publication Data

US 2021/0194613 A1 Jun. 24, 2021

(30) Foreign Application Priority Data

Dec. 18, 2019 (KR) .......... 10-2019-0169975

(51) Int. Cl.
*H04J 3/06* (2006.01)

(52) U.S. Cl.
CPC .......... *H04J 3/0673* (2013.01); *H04J 3/0641* (2013.01); *H04J 3/0667* (2013.01); *H04J 3/0697* (2013.01)

(58) Field of Classification Search
USPC .......................................... 370/305
See application file for complete search history.

(56) References Cited

U.S. PATENT DOCUMENTS

| | | | |
|---|---|---|---|
| 9,787,806 B2 | 10/2017 | Oren et al. | |
| 2008/0151915 A1* | 6/2008 | Masuya | H04L 65/103 370/516 |
| 2011/0200051 A1 | 8/2011 | Rivaud et al. | |
| 2012/0236765 A1* | 9/2012 | Huang | H04W 56/002 370/280 |
| 2015/0156261 A1* | 6/2015 | Blake | H04L 69/28 709/248 |
| 2016/0173267 A1* | 6/2016 | Zhang | H04L 7/0008 709/248 |
| 2016/0174178 A1* | 6/2016 | Nistor | H04L 63/00 370/503 |
| 2017/0055233 A1* | 2/2017 | Takano | H04W 92/18 |
| 2017/0126345 A1* | 5/2017 | Testicioglu | G06F 9/00 |

FOREIGN PATENT DOCUMENTS

EP 2487819 A1 8/2012

OTHER PUBLICATIONS

NPL document, IEEE Std 1588-2019, dated Nov. 7, 2019, (hereinafter 1588PTP). (Year: 2019).*
Anthony Magee, "Synchronization in Next-Generation Mobile Backhaul Networks", Carrier Scale Ethernet, IEEE Communications Magazine, Oct. 2010, pp. 110-116 (7 pages total).
Search Report dated May 18, 2021, from the European Patent Office in application No. 20214218.8.

* cited by examiner

*Primary Examiner* — Gregory B Sefcheck
*Assistant Examiner* — Majid Esmaeilian
(74) *Attorney, Agent, or Firm* — Sughrue Mion, PLLC

(57) ABSTRACT

A synchronization method of a communication network, the synchronization method comprises monitoring a connection state of second communication nodes that are synchronized using a synchronization signal provided through a first communication node to which a synchronization source is connected, determining whether the number of the connected second communication nodes exceeds a reference value according to a result of the monitoring and switching a synchronization mode of at least one second communication node when the number of the second communication nodes exceeds a reference value.

12 Claims, 6 Drawing Sheets

FIG. 5

| DAC Unit Name | DAS Unit IP Address | 1588 Support | SyncE Support | 1588 BC Capability | 1588 Connection Tracking Enable | Max 1588 Slave Capacity | Current 1588 Mode | Current1588 Connection Tracking Counts | Current1588 Slave Counts | Unit State | SyncState Interface | SyncMaster Interface |
|---|---|---|---|---|---|---|---|---|---|---|---|---|
| RU001 | 192.168.9.101 | Yes | Yes | Yes | No | 8 | BC | N/A | 4 | Active | IF1 | IF2, IF3, IF4 |
| HU002 | 10.0.0.10 | Yes | Yes | No | No | N/A | TC | N/A | N/A | Active | IF2 | IF2, IF3, IF4 |
| DAU020 | 30.0.0.10 | Yes | Yes | Yes | Yes | 64 | TC | 7 | N/A | Active | IF2 | IF2, IF3, IF4, IF5, IF6 |
| RU030 | 20.0.0.10 | Yes | No | No | No | N/A | N/A | N/A | N/A | Inactive | N/A | N/A |
| ... | | | | | | | | | | | | |

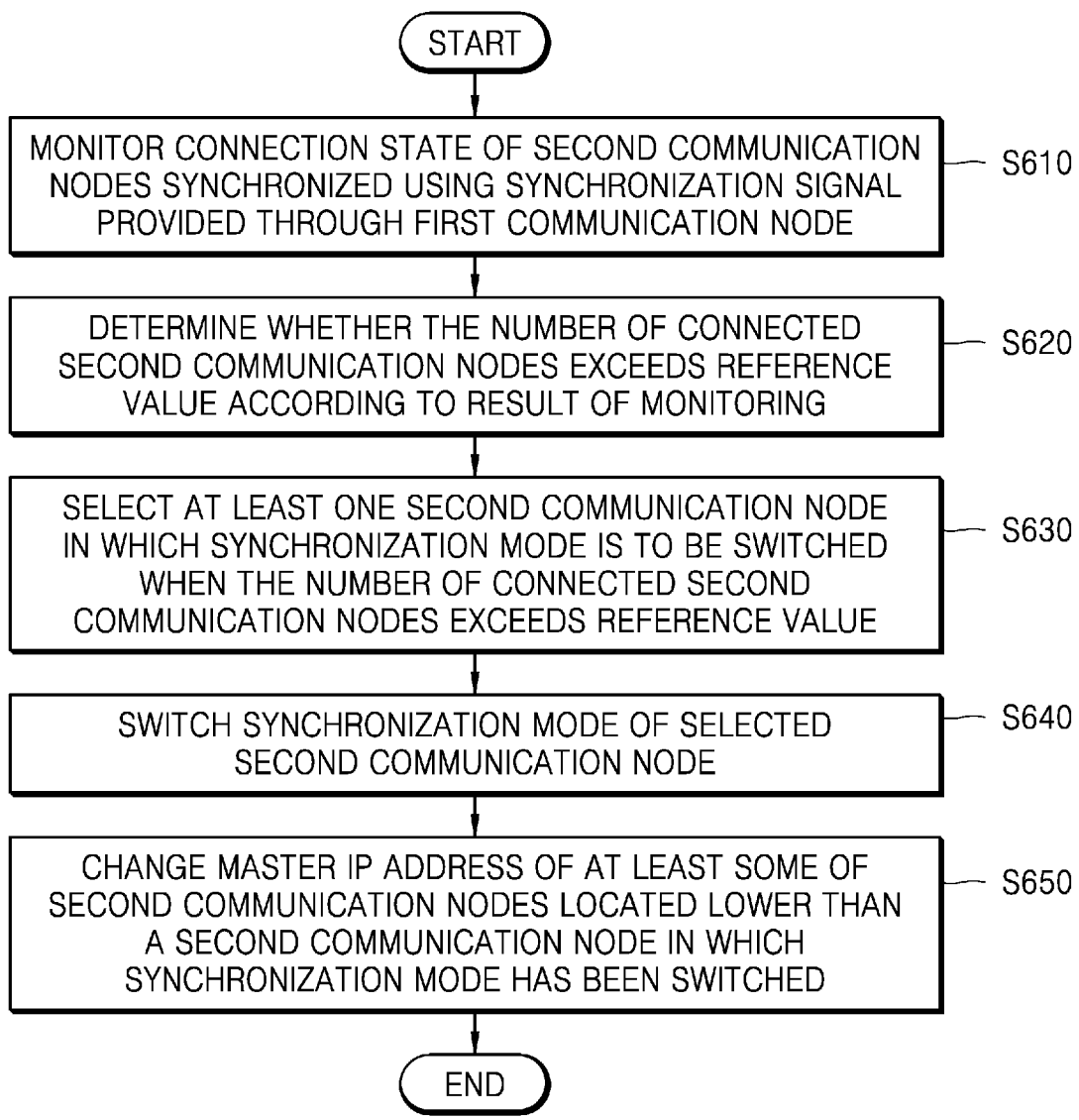

NETWORK MANAGEMENT SYSTEM AND METHOD FOR SYNCHRONIZATION OF COMMUNICATION NETWORK

CROSS-REFERENCE TO RELATED APPLICATIONS

This application claims the benefits of Korean Patent Applications No. 10-2019-0169975, filed on Dec. 18, 2019, in the Korean Intellectual Property Office, the disclosures of which are incorporated herein in their entireties by reference.

BACKGROUND

1. Field

The disclosure relates to a network management system and a synchronization method of a communication network, and more particularly, to a network management system capable of switching a synchronization mode of at least one second communication node according to a result of monitoring a connection state of second communication nodes that are synchronized using a synchronization signal provided through a first communication node to which a synchronization source is connected, and a synchronization method of a communication network.

2. Description of the Related Art

A distributed antenna system (DAS), which is currently commercially available, receives external reference clock information from a headend device and transmits reference clocks to other nodes (e.g., an extension device or a remote device, etc.).

However, headend devices are generally arranged in a separate space inside a building where most of distributed antenna systems are installed for reasons such as large size and weight, and requiring separate power supply. In such a structure, in order to receive external reference clock information, there is a structural inefficiency in that a clock source and a headend device that are far apart from each other need to be connected with a cable.

SUMMARY

Provided are a network management system capable of switching a synchronization mode of at least one second communication node according to a result of monitoring a connection state of second communication nodes that are synchronized using a synchronization signal provided through a first communication node to which a synchronization source is connected, and a synchronization method of a communication network.

According to an aspect of an embodiment, a synchronization method of a communication network, the synchronization method may comprises monitoring a connection state of second communication nodes that are synchronized using a synchronization signal provided through a first communication node to which a synchronization source is connected, determining whether the number of the connected second communication nodes exceeds a reference value according to a result of the monitoring and switching a synchronization mode of at least one second communication node when the number of the second communication nodes exceeds a reference value.

According to an aspect of an embodiment, the communication network may comprises at least any one of a headend device, an extension device, and a remote device.

According to an aspect of an embodiment, the first communication node to which the synchronization source is connected may be the extension device or the remote device.

According to an aspect of an embodiment, the communication network may perform synchronization according to the IEEE 1588 PTP protocol.

According to an aspect of an embodiment, the first communication node may operate as a grand master node in synchronization of the communication network.

According to an aspect of an embodiment, the second communication nodes may operate in a synchronization mode of a transparent clock mode, a boundary clock mode, or a slave mode of the IEEE 1588 PTP protocol.

According to an aspect of an embodiment, the monitoring of the connection state of the second communication nodes may comprise monitoring a connection state of the second communication nodes based on a slave count change event of the IEEE 1588 PTP protocol received from the first communication node.

According to an aspect of an embodiment, the monitoring of the connection state of the second communication nodes may comprise monitoring the connection state of the second communication nodes using a connection tracking function of the IEEE 1588 PTP protocol of a second communication node capable of operating in a boundary clock mode from among the second communication nodes.

According to an aspect of an embodiment, the switching of the synchronization mode of the at least one second communication node may comprise selecting the at least one second communication node capable of operating in a synchronization mode of a boundary clock mode from among the second communication nodes, and switching a synchronization mode of the at least one selected second communication node.

According to an aspect of an embodiment, the switching of the synchronization mode of the at least one second communication node may comprise switching a synchronization mode of a second communication node located at the uppermost based on a transmission direction of a downlink communication signal from among second communication nodes capable of operating in the synchronization mode of the boundary clock mode.

According to an aspect of an embodiment, the reference value may be set to a value smaller than the maximum slave node capacity of the first communication node.

According to an aspect of an embodiment, the second communication nodes may set an IP address of the first communication node as a master IP address.

According to an aspect of an embodiment, when the synchronization mode of the at least one second communication node is switched, a master IP address of at least some of the second communication nodes located lower than the second communication node in which the synchronization mode has been switched, from among the second communication nodes, may be changed to an IP address of the second communication node in which the synchronization mode has been switched.

According to an aspect of an embodiment, the at least some of the second communication nodes may be a communication node excluding a second communication node located between the first communication node and the second communication node in which the synchronization mode has been switched and a second communication node located lower than the second communication node, from among the second communication nodes.

According to an aspect of an embodiment, a network management system may comprise a processor configured to determine, according to a result of monitoring a connection state of second communication nodes that are synchronized using a synchronization signal provided through a first communication node to which a synchronization source is connected, whether the number of the connected second communication nodes exceeds a reference value and a communication interface configured to transmit a setting signal for switching a synchronization mode of at least one second communication node to the at least one second communication node when the number of the second communication nodes exceeds a reference value.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a table showing characteristic information of each of communication nodes according to an embodiment; and FIG. 6 is a flowchart illustrating a synchronization method of a communication network according to an embodiment.

DETAILED DESCRIPTION

Figure 1:
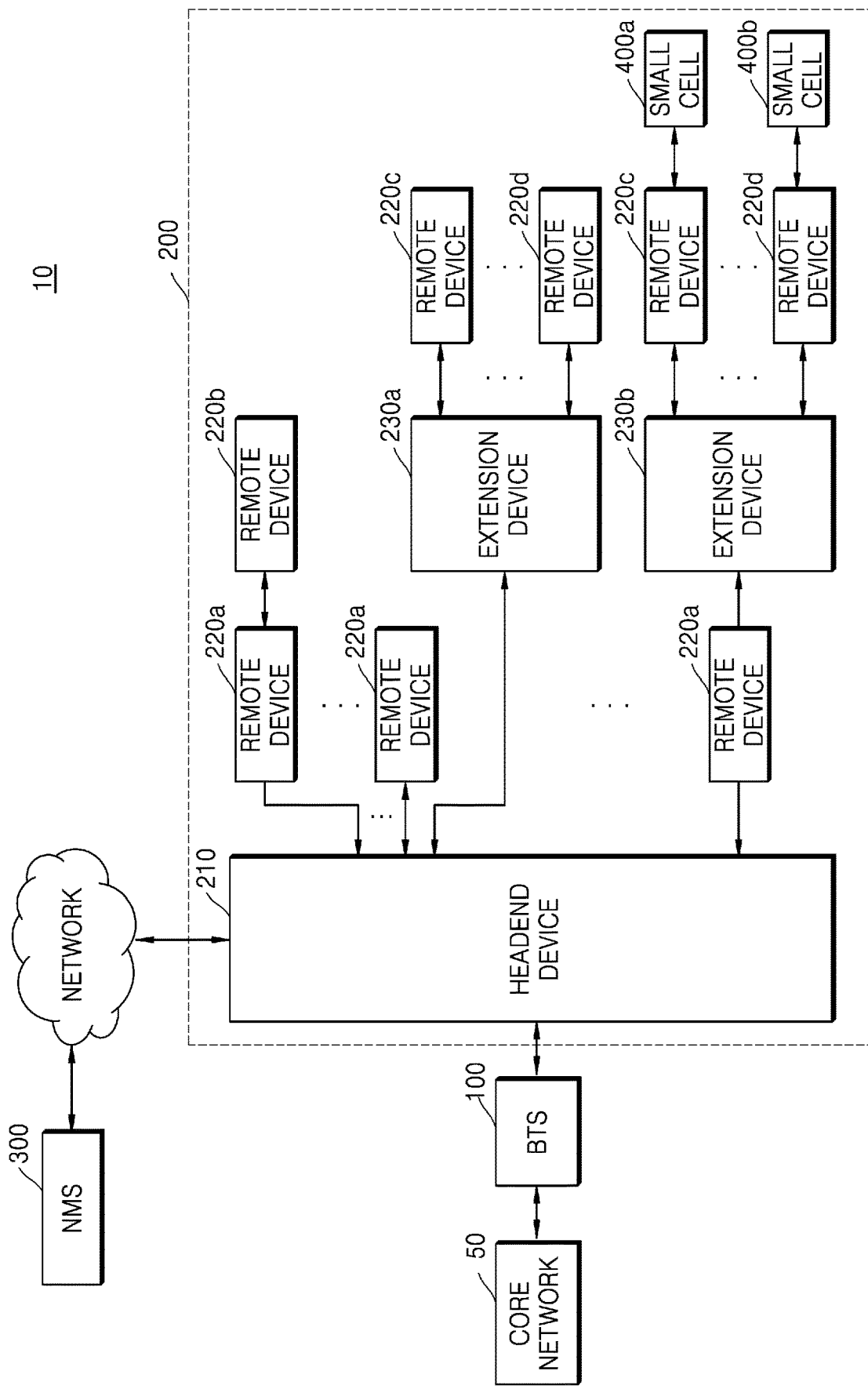
FIG. 1 is a conceptual diagram of a communication system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a communication system 10 according to an embodiment.

Referring to FIG. 1, the communication system 10 may include a core network 50, a base transceiver station (BTS) 100, a distributed antenna system (DAS) 200 for relaying communication signals of the BTS 100, and a network management system (NMS) 300 for managing and monitoring the DAS 200.

According to an embodiment, the communication system 10 may be divided into a core network 50, the BTS 100 constituting an access network for connecting a user terminal to the core network 50, and the DAS 200.

The DAS 200 is described as an example of a communication network, and may directly perform at least some functions of the base station 100.

According to an embodiment, the DAS 200 may configure a single communication network with the NMS 300.

The DAS 200 may include a headend device 210 that is communicatively connected to the base station 100 and constitutes a headend node, a plurality of remote devices 220a, 220b, 220c, and 220d that constitute a remote node and are connected to other remote nodes or arranged at each remote service location and communicatively connected to a user terminal, extension devices 230a and 230b constituting an extension node, and small cells 400a and 400b.

According to an embodiment, the DAS 200 may be implemented as an analog DAS.

According to another embodiment, the DAS 200 may be implemented as a digital DAS, and in some cases may be implemented in a hybrid type, for example, in the form of analog processing for some nodes and digital processing for other nodes.

Meanwhile, FIG. 1 shows an example of a topology of the DAS 200 and various variations are possible in the DAS 200 considering specificity of installation areas and application fields (e.g., in-building, a subway, a hospital, a stadium, etc.).

The extension devices 230a and 230b in the DAS 200 may be utilized when the number of branches of the headend device 210 is limited compared to the number of remote devices to be installed.

Each node in the DAS 200 and its function will be described in more detail. First, the headend device 210 may serve as an interface with a base station.

According to an embodiment, the headend device 210 may be connected to a plurality of base stations.

According to an embodiment, the headend device 210 may be implemented with a main headend device and a sub headend device, and may be connected to a base station for each service frequency band of a specific service provider or a base station for each sector. In some cases, the main headend device may compensate for coverage by the sub headend device.

In general, because a radio frequency (RF) signal received from a base station is a high-power signal, the headend device 210 may attenuate such a high-power RF signal into a signal of power suitable for processing at each node. The headend device 210 may lower a high-power RF signal for each frequency band or for each sector to a low-power RF signal. The headend device 210 may be coupled with the low-power RF signal and may distribute the coupled signal to the extension device 230a or the remote device 220a.

According to an embodiment, the headend device 210 may directly receive a communication signal (e.g., Common Public Radio Interface (CPRI), Open Radio Interface (ORI), Open Baseband Remote Radiohead Interface (OBSAI), e-CPRI, etc.) in a digital format from a base station.

Each of the remote devices 220a, 220b, 220c, and 220d may separate received coupled signals for each frequency band and perform signal processing such as amplification. Accordingly, each of the remote devices 220a, 220b, 220c, and 220d may transmit a base station signal to a user terminal within the service coverage of the remote device through a service antenna (not shown).

The remote device 220a and the remote device 220b may be connected to each other through an RF cable or wireless communication, and a plurality of remote devices may be connected to each other in a cascade structure if necessary.

The extension device 230a may transmit the received coupled signal to the remote device 220c connected to the extension device 230a.

The extension device 230b is connected to one end of the remote device 220a and may receive a signal received from the headend device 210 through the remote device 220a in downlink communication. The extension device 230b may transmit the received signal back to the remote device 220d connected to a rear end of the extension device 230b.

The base station 100 and the headend device 210 may be connected to each other through an RF cable, an optical cable, or an Ethernet cable (e.g., a twisted cable or a UTP cable), and may be connected to each other through an optical cable or an Ethernet cable (e.g., a twisted cable or a UTP cable), except between the remote device 220a and the remote device 220b, at a lower end of the headend device 210, and a signal transport medium between nodes or a communication method thereof may vary.

According to an embodiment, when internal components of the DAS 200 are connected to each other by an optical cable, the headend device 210, the remote devices 220a, 220b, 220c, and 220d, and the extension devices 230a and 230b may include an optical transceiver module for transmitting and receiving optical signals through electro-optical conversion/photoelectric conversion, and may further include a wavelength division multiplexing (WDM) device when nodes are connected to each other by a single optical cable.

The DAS 200 may be connected to an external management device (not shown) such as the NMS 300 or a network operation center (NOC) (not shown) via a network. Accordingly, an administrator may remotely monitor the state and problem of each node of the DAS 200, and may remotely control the operation of each node.

In FIG. 1, a synchronization source connected to a communication node is omitted for convenience of description.

Figure 2:
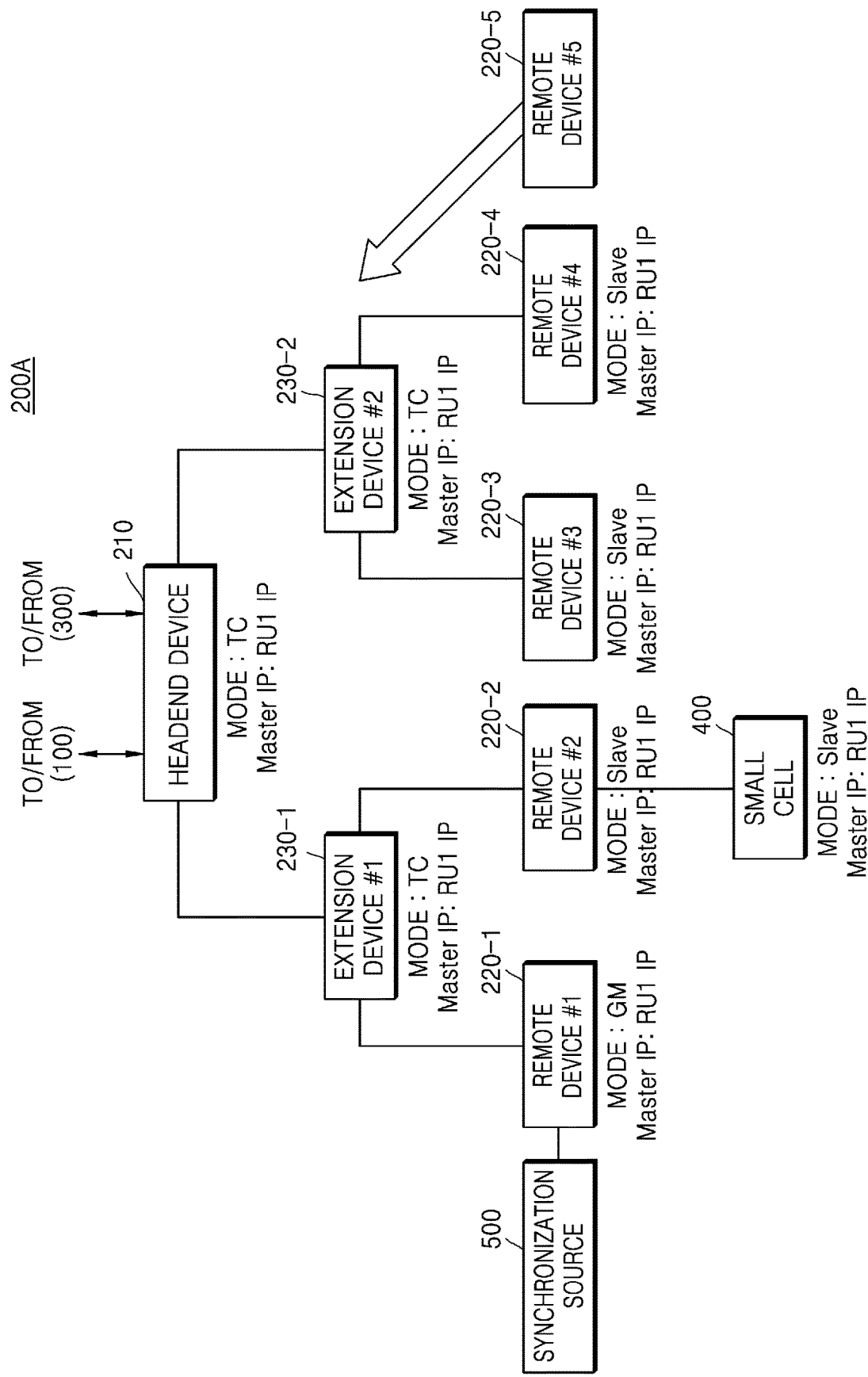
FIG. 2 is a block diagram according to an embodiment before a communication node is added in a distributed antenna system shown in FIG. 1.
Figure 3:
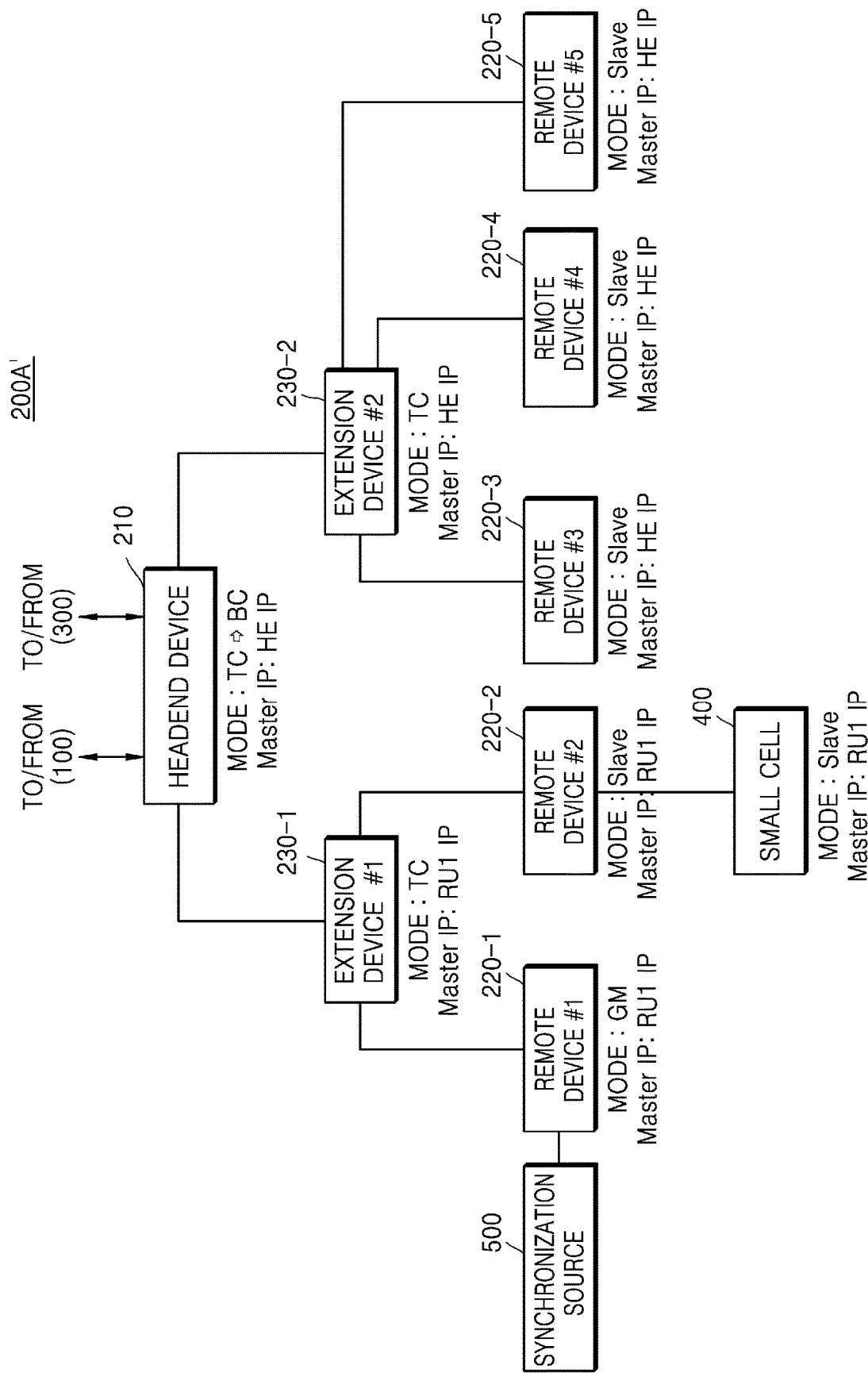
FIG. 3 is a block diagram according to an embodiment after a communication node is added in the distributed antenna system shown in FIG. 2.

FIG. 2 is a block diagram according to an embodiment before a communication node is added in the DAS 200 shown in FIG. 1. FIG. 3 is a block diagram according to an embodiment after a communication node is added in a DAS 200A shown in FIG. 2.

Referring to FIGS. 1 and 2, the DAS 200A may include a headend device 210, remote devices 220-1 to 220-4, extension devices 230-1 and 230-2, a small cell 400, and a synchronization source 500.

The DAS 200A as an example of a communication network may include a plurality of communication nodes (e.g., the headend device 210, the remote devices 220-1 to 220-4, and the extension devices 230-1 and 230-2).

According to an embodiment, the DAS 200A may perform synchronization according to the IEEE 1588 PTP protocol.

The DAS 200A may include a first communication node (e.g., 220-1) to which a synchronization source 500 is connected, and second communication nodes (e.g., 210, 220-2~220-4, 230-1~230-2, and 400) that are synchronized using a synchronization signal provided through the first communication node (e.g., 220-1).

The synchronization source 500 may generate a synchronization signal.

According to an embodiment, the synchronization source 500 may include a global positioning system (GPS) antenna. The synchronization source 500 may receive a GPS signal from the outside of the DAS 200A and use the received GPS signal as a synchronization signal.

According to an embodiment, the synchronization source 500 may use a synchronization clock source such as a primary reference clock (PRC) and a primary reference source (PRS) of Stratum 1, a synchronization supply unit (SSU), stand-alone synchronization equipment (SASE), and building integrated timing supply (BITS) of Stratum 2, and an SDH equipment clock (SEC) of Stratum 3.

According to an embodiment, the synchronization source 500 may be connected to the headend device 210, the extension devices 230-1 and 230-2, or the remote devices 220-1 to 220-4.

According to an embodiment, communication nodes of the DAS 200A may receive synchronization signals from a synchronization source selected from a plurality of synchronization sources.

A first communication node (e.g., 220-1) may operate as a grand master node that provides a grand master clock signal in synchronization of a communication network (e.g., 200A).

The NMS 300 that manages communication nodes (e.g., 210, 220-1 to 220-4, 230-1 to 230-2, and 400) of the DAS 200A or the headend device 210 of the DAS 200A may set or switch a synchronization mode of the communication nodes (e.g., 210, 220-1 to 220-4, 230-1 to 230-2, and 400).

According to an embodiment, the synchronization mode may include a transparent clock (TC) mode, a boundary clock (BC) mode, or a slave mode. According to an embodiment, a communication node may operate as a master node or a slave node in a boundary clock mode.

FIG. 2 shows a synchronization mode and a master IP address of communication nodes set before a new communication node (e.g., 200-5) is additionally connected to the communication nodes.

The first communication node (e.g., 220-1) to which the synchronization source 500 is connected may operates as a grand master node, and the second communication nodes 210, 220-2 to 220-4, 230-1 to 230-2, and 400 that are synchronized using a synchronization signal provided from the first communication node (e.g., 220-1) may operate in a transparent clock mode, a boundary clock mode, or a slave mode.

In the present specification, an "upper" node may refer to a node that receives a downlink communication signal relatively first based on a transmission direction of the downlink communication signal.

In the present specification, an "uppermost" node may refer to a node that receives a downlink communication signal relatively first based on a transmission direction of the downlink communication signal.

In the present specification, a "lower" node may refer to a node that receives a downlink communication signal relatively later based on a transmission direction of the downlink communication signal.

According to an embodiment, nodes (e.g., 210, 230-1, and 230-2) upper than the first communication node (e.g., 220-1) may operate in a transparent clock mode, and communication nodes (e.g., 220-2 to 220-4) of the same level as the first communication node (e.g., 220-1) and a lower communication node (e.g., 400) may operate as slave nodes.

A master IP address of the second communication nodes 210, 220-2 to 220-4, 230-1 to 230-2, and 400 may be set to an IP address of the first communication node (e.g., 220-1).

Referring to FIG. 3 together, compared to the DAS 200 of FIG. 2, a new communication node (e.g., 220-5) may be additionally connected to a communication network, for example, a DAS 200'.

The NMS 300 or the headend device 210 of the DAS 200A may monitor a connection state of the second communication nodes 210, 220-2 to 220-5, 230-1 to 230-2, and 400.

According to an embodiment, the NMS 300 or the headend device 210 of the DAS 200A may monitor the connection state of the second communication nodes 210, 220-2 to 220-5, 230-1 to 230-2, and 400 based on a slave count change event of the IEEE 1588 PTP protocol received from the first communication node (e.g., 220-1).

According to another embodiment, the NMS 300 or the headend device 210 of the DAS 200A may monitor the connection state of the second communication nodes 210, 220-2 to 220-5, 230-1 to 230-2, and 400 by using a connection tracking function of the IEEE 1588 PTP protocol of at least one second communication node (e.g., 210) capable of operating in a synchronization mode of a boundary clock mode from among the second communication nodes 210, 220-2 to 220-5, 230-1 to 230-2, and 400.

The NMS 300 or the headend device 210 of the DAS 200A may determine whether the number of connected second communication nodes (e.g., 220-2 to 220-5, 230-1 to 230-2, and 400) exceeds a reference value according to a result of the monitoring.

The NMS 300 or the headend device 210 of the DAS 200A may switch a synchronization mode of the at least one second communication node (e.g., 210) when the number of connected second communication nodes (e.g., 210, 220-2 to 220-5, 230-1 to 230-2, and 400) exceeds a reference value according to a result of the determination.

According to an embodiment, when the reference value is 7, according to the addition of a new communication node 220-5, the number of connected second communication nodes (e.g., 210, 220-2 to 220-5, 230-1 to 230-2, and 400) becomes eight, and may exceed the reference value.

According to an embodiment, the synchronization mode of the at least one second communication node (e.g., 210) may be switched from a transparent clock mode to a boundary clock mode.

According to an embodiment, the NMS 300 or the headend device 210 of the DAS 200A may switch the synchronization mode of the second communication node (e.g., 210) capable of operating in a boundary clock mode from among the second communication nodes (e.g., 210, 220-2 to 220-5, 230-1 to 230-2, and 400) when the number of connected second communication nodes (e.g., 210, 220-2 to 220-5, 230-1 to 230-2, and 400) exceeds a reference value according to a result of the determination.

According to another embodiment, the NMS 300 or the headend device 210 of the DAS 200A may switch the synchronization mode of the second communication node (e.g., 210) located at the uppermost while being able to operate in a boundary clock mode from among the second communication nodes (e.g., 210, 220-2 to 220-5, 230-1 to 230-2, and 400) when the number of connected second communication nodes (e.g., 210, 220-2 to 220-5, 230-1 to 230-2, and 400) exceeds a reference value according to a result of the determination.

According to an embodiment, the reference value may be set to a value (e.g., 7) smaller than the maximum slave node capacity (e.g., 9) of the first communication node (e.g., 220-1). In this case, even if a new communication node is added to a communication network (e.g., 200A), stable communication network operation is possible by switching the synchronization mode of the at least one second communication node (e.g., 210) before reaching the maximum slave node capacity of the first communication node (e.g., 220-1).

When the synchronization mode of the at least one second communication node (e.g., 210) is switched from a transparent clock mode to a boundary clock mode, a master IP address of at least some (e.g., 230-2, 220-3, and 220-4) of the second communication nodes (e.g., 230-1, 230-2, 220-2 to 220-4, and 400) located lower than the second communication node (e.g., 210) in which the synchronization mode has been switched may be changed to an IP address (HE IP) of the second communication node (e.g., 210) in which the synchronization mode has been switched.

In the case of an additionally connected communication node (e.g., 220-5), a synchronization mode (e.g., a slave mode) and a master IP address (e.g., HE IP) may be determined according to a location to which the corresponding communication node (e.g., 220-5) is connected.

According to an embodiment, from among the second communication nodes 220-2 to 220-4, 230-1 to 230-2, and 400 located lower than the second communication node 210 in which the mode has been switched, a master IP address of the remaining second communication nodes 220-3 to 220-4 and 230-2 excluding the second communication node 230-1 located between the first communication node 220-1 and the second communication node 210 in which the mode has been switched and the second communication nodes 220-2 and 400 located lower than the second communication node 230-1 may be changed. In this case, the master IP address may be changed from an IP address (e.g., RU1 IP) of the existing first communication node (e.g. 220-1) to the IP address (e.g., HE IP) of the second communication node (e.g., 210) in which the mode has been switched.

Figure 4:
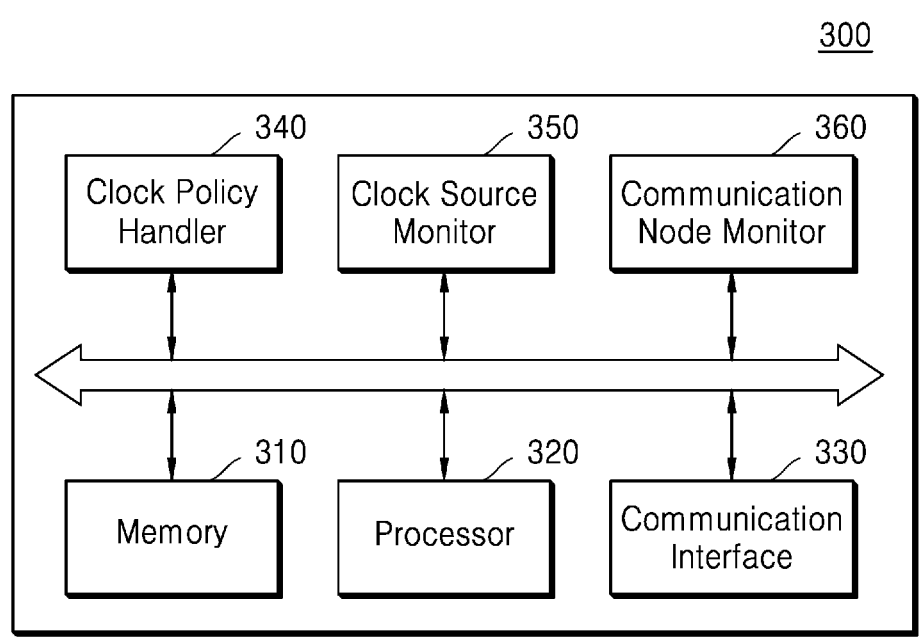
FIG. 4 is a block diagram of a network management system shown in FIG. 1, according to an embodiment.

FIG. 4 is a block diagram of a network management system shown in FIG. 1, according to an embodiment. FIG.

5 is a table showing characteristic information of each of communication nodes according to an embodiment.

Referring to FIGS. 1 to 4, the NMS 300 may include a memory 310, a processor 320, a communication interface 330, a clock policy handler 340, a clock source monitor 350, and a communication node monitor 360.

The memory 310 may store data necessary for the operation of the NMS 300.

According to an embodiment, the memory 310 may store data necessary for setting and managing a communication network managed by the NMS 300, for example, a synchronization mode of communication nodes (e.g., 210, 220-1 to 220-5, 230-1 to 230-2, and 400) in the DAS 200 and a master IP address associated with the synchronization mode.

According to an embodiment, the memory 310 may store characteristic information of a communication node in the form of the table shown in FIG. 5.

The table shown in FIG. 5 may include characteristic information of a communication node. The table for including characteristic information of a communication node may include identification information of a communication node (e.g., DAS unit Name), an IP address of a communication node (e.g., a DAS Unit IP Address), whether to support IEEE 1588 PTP (e.g., 1588 support), whether to support syncE (e.g., syncE support), whether to support a boundary clock mode of the IEEE 1588 PTP protocol (e.g., 1588 BC capability), whether to support a connection tracking function of the IEEE 1588 PTP protocol (e.g., 1588 connection tracking enable), the maximum slave node capacity in a communication node (e.g., max 1588 slave capacity), a synchronization mode of the IEEE 1588 PTP protocol currently used in a communication node (e.g., a current 1588 mode), the number of slave nodes tracked through a connection tracking function (e.g., current 1588 connection tracking counts), the number of slave nodes currently connected to a communication node (e.g., current 1588 slave counts), an active state of a corresponding communication node (e.g., a unit state), and a state of a slave-master interface (e.g., a sync slave interface or a sync master interface).

The processor 320 may control all operations of the NMS 300, and the NMS 300 may perform determination and processing.

According to an embodiment, the processor 320 may determine a synchronization mode of communication nodes (e.g., 210, 220-1 to 220-5, 230-1 to 230-2, and 400) and a master IP address associated with the synchronization mode based on characteristic information of a communication node stored in the memory 310.

The communication interface 330 may interface communication between the NMS 300 and the DAS 200.

The clock policy handler 340 may generate and output a setting signal for setting communication nodes in a communication network, for example, the DAS 200.

According to an embodiment, the setting signal may include information about a protocol to be used for synchronization in communication nodes (e.g., IEEE 1588 PTP, syncE, etc.), and information about a synchronization mode to be used in communication nodes (e.g., a transparent clock mode, a boundary clock mode, master and slave settings, etc.).

According to an embodiment, the clock policy handler 340 may transmit a setting signal for setting communication nodes in a communication network, for example, the DAS 200, to the DAS 200 through the communication interface 330 according to a result of the determination of the processor 320.

According to an embodiment, the setting signal may include a control signal for setting SyncE information and IEEE 1588 PTP information of communication nodes.

According to an embodiment, the clock policy handler 340 may be implemented in the form of some functions of the processor 320. In this case, the clock policy handler 340 may be included in the processor 320.

According to an embodiment, the clock policy handler 340 may set a synchronization mode of the existing communication nodes and a master IP address associated with the synchronization mode when a new communication node is connected to the DAS 200 by using a monitoring result of the communication node monitor 360.

The clock source monitor 350 may monitor the state of synchronization sources (e.g., a quality state, an operation state, a failure state, an additional connection or disconnection state of synchronization sources, etc.) in a communication network, for example, the DAS 200.

According to an embodiment, the clock source monitor 350 may reflect and store a result of the monitoring in a table stored in the memory 310.

The communication node monitor 360 may monitor the state of communication nodes (e.g., a quality state, an operation state, a failure state, an additional connection or disconnection state of synchronization sources, etc.) in a communication network, for example, the DAS 200.

According to an embodiment, the communication node monitor 360 may reflect a result of the monitoring in a table stored in the memory 310, for example, the table shown in FIG. 5, to update the table.

Although FIG. 4 shows the configuration of the NMS 300, when the headend device 210 of the DAS 200 performs a synchronization method of a communication network according to an embodiment, the headend device 210 may perform the same function as in FIG. 4 including the components 310 to 360 of FIG. 4.

FIG. 6 is a flowchart illustrating a synchronization method of a communication network according to an embodiment.

Referring to FIGS. 1 to 6, in operation S610, the NMS 300 or the headend device 210 may monitor a connection state of synchronized second communication nodes (e.g., 210, 220-2 to 220-4, and 230-1 to 230-2) using a synchronization signal provided through a first communication node (e.g., 220-1) to which the synchronization source 500 is connected in the communication network (e.g., the DAS 200).

In operation S620, the NMS 300 or the headend device 210 may determine whether the number of connected second communication nodes (e.g., 210, 220-2 to 220-5, and 230-1 to 230-2) exceeds a reference value according to a result of the monitoring.

In operation S630, according to a result of the determination in operation S620, when the number of connected second communication nodes (e.g., 210, 220-2 to 220-5, and 230-1 to 230-2) exceeds a reference value, the NMS 300 or the headend device 210 may select at least one second communication node (e.g., 210) in which the synchronization mode is to be switched.

According to an embodiment, from among second communication nodes (e.g., 210, 220-2 to 220-5, 230-1 to 230-2, and 400), the headend device 210 of the NMS 300 or the DAS 200A may select a second communication node (e.g., 210) capable of operating in a boundary clock mode or a second communication node (e.g., 210) capable of operating in a boundary clock mode and located at the uppermost as a communication node in which the synchronization mode is to be switched.

In operation S640, the NMS 300 or the headend device 210 may switch the synchronization mode of the second communication node (e.g., 210) selected in operation S630.

According to an embodiment, the NMS 300 or the headend device 210 may switch the synchronization mode of the at least one second communication node (e.g., 210) from a transparent clock mode to a boundary clock mode.

In operation S650, the NMS 300 or the headend device 210 may change a master IP address of at least some (e.g., 230-2, 220-3, and 220-4) of second communication nodes (e.g., 220-2 to 220-4, 230-1 to 230-2, and 400) located lower than the second communication node (e.g., 210) in which the synchronization mode has been switched to an IP address (HE IP) of the second communication node (e.g., 210) in which the synchronization mode has been switched.

According to an embodiment, from among the second communication nodes 220-2 to 220-4, 230-1 to 230-2, and 400 located lower than the second communication node 210 in which the mode has been switched, a master IP address of the remaining second communication nodes 220-3 to 220-4 and 230-2 excluding the second communication node 230-1 located between the first communication node 220-1 and the second communication node 210 in which the mode has been switched and the second communication nodes 220-2 and 400 located lower than the second communication node 230-1 may be changed. In this case, the master IP address may be changed from an IP address (e.g., RU1 IP) of the existing first communication node (e.g. 220-1) to the IP address (e.g., HE IP) of the second communication node (e.g., 210) in which the mode has been switched.

Hereinabove, the disclosure has been described with reference to the preferred embodiments. However, it will be appreciated by one of ordinary skill in the art that various modifications and changes of the disclosure can be made without departing from the spirit and the scope of the inventive concept which are defined in the appended claims and their equivalents.

What is claimed is:

1. A synchronization method of a communication network, the synchronization method comprising: monitoring a connection state of second communication nodes that are synchronized using a synchronization signal provided through a first communication node to which a synchronization source is connected, wherein the second communication nodes set an internet protocol (IP) address of the first communication node as a master IP address; determining whether the number of the synchronized second communication nodes exceeds a preset reference value according to a result of the monitoring; and switching a synchronization mode of at least one second communication node among the synchronized second communication nodes when the number of the second communication nodes exceeds a-the preset reference value, wherein, when the synchronization mode of the at least one second communication node is switched, the at least one second communication node and a child node of the at least one second communication node change the master IP address from the IP address of the first communication node to an IP address of the at least one second communication node.

2. The synchronization method of claim 1, wherein the communication network comprises:
at least any one of a headend device, an extension device, and a remote device.

3. The synchronization method of claim 2, wherein the first communication node to which the synchronization source is connected is the extension device or the remote device.

4. The synchronization method of claim 1, wherein the communication network performs synchronization according to the IEEE 1588 PTP protocol.

5. The synchronization method of claim 1, wherein the first communication node operates as a grand master node in synchronization of the communication network.

6. The synchronization method of claim 1, wherein the second communication nodes operate in a synchronization mode of a transparent clock mode, a boundary clock mode, or a slave mode of the IEEE 1588 PTP protocol.

7. The synchronization method of claim 1, wherein the monitoring of the connection state of the second communication nodes comprises:
monitoring a connection state of the second communication nodes based on a slave count change event of the IEEE 1588 PTP protocol received from the first communication node.

8. The synchronization method of claim 1, wherein the monitoring of the connection state of the second communication nodes comprises:
monitoring the connection state of the second communication nodes using a connection tracking function of the IEEE 1588 PTP protocol of a second communication node capable of operating in a boundary clock mode from among the second communication nodes.

9. The synchronization method of claim 1, wherein the switching of the synchronization mode of the at least one second communication node comprises:
selecting the at least one second communication node capable of operating in a synchronization mode of a boundary clock mode from among the second communication nodes, and switching a synchronization mode of the at least one selected second communication node.

10. The synchronization method of claim 9, wherein the switching of the synchronization mode of the at least one second communication node comprises:
switching a synchronization mode of a second communication node located at the uppermost based on a transmission direction of a downlink communication signal from among second communication nodes capable of operating in the synchronization mode of the boundary clock mode.

11. The synchronization method of claim 1, wherein the preset reference value is set to a value smaller than the maximum slave node capacity of the first communication node.

12. A network management system comprising: a processor configured to determine, according to a result of monitoring a connection state of second communication nodes that are synchronized using a synchronization signal provided through a first communication node to which a synchronization source is connected, whether the number of the synchronized second communication nodes exceeds a preset reference value, wherein the second communication nodes set an internet protocol (IP) address of the first communication node as a master IP address; and a communication interface configured to transmit a setting signal for switching a synchronization mode to the at least one second communication node among the synchronized second communication nodes when the number of the second communication nodes exceeds the preset reference value, wherein, when the setting signal causes the at least one second communication node and a child node of the at least one second communication node to change the master IP address from the IP address of the first communication node to an IP address of the at least one second communication node.

\* \* \* \* \*